United States Patent

[11] 3,572,488

[72] Inventor Shigeaki Kuramochi
Tokyo, Japan
[21] Appl. No. 791,278
[22] Filed Jan. 15, 1969
[45] Patented Mar. 30, 1971
[73] Assignee Louis Marx & Co., Inc.
New York, N.Y.

[54] SHIFT AND SHIFT LOCK MECHANISM FOR TYPEWRITER
6 Claims, 4 Drawing Figs.

[52] U.S. Cl. ........................................ 197/73, 197/80
[51] Int. Cl. .................................... B41j 11/14, B41j 29/64
[50] Field of Search .......................... 197/71, 72, 73, 79, 80

[56] References Cited
UNITED STATES PATENTS
984,284  2/1911  McBirney .................... 197/81
1,227,438  5/1917  Hess .......................... 197/79
1,448,411  3/1923  Lehmann ..................... 197/79
1,475,664  11/1923  Utz .............................. 197/79
2,251,122  7/1941  Dobson ....................... 197/73
2,705,553  4/1955  Thomson ..................... 197/22

Primary Examiner—Ernest T. Wright, Jr.
Assistant Examiner—Stephen C. Pellegrino
Attorney—Blum, Moscovitz, Friedman and Kaplan ABSTRACT: A shift mechanism for a typewriter having a shift key and a shift lock key, both of which are effective to shift the typewriter carriage. A latching arm is normally spring-biased to a nonlatching position and is rocked forwardly to a latching position when the shift lock key is operated to retain the carriage in shifted position until the shift key is operated to release the latching force on the latch arm to permit it to be biased to a nonlatching position for release of the carriage from the shifted position.

Patented March 30, 1971
3,572,488
2 Sheets-Sheet 1
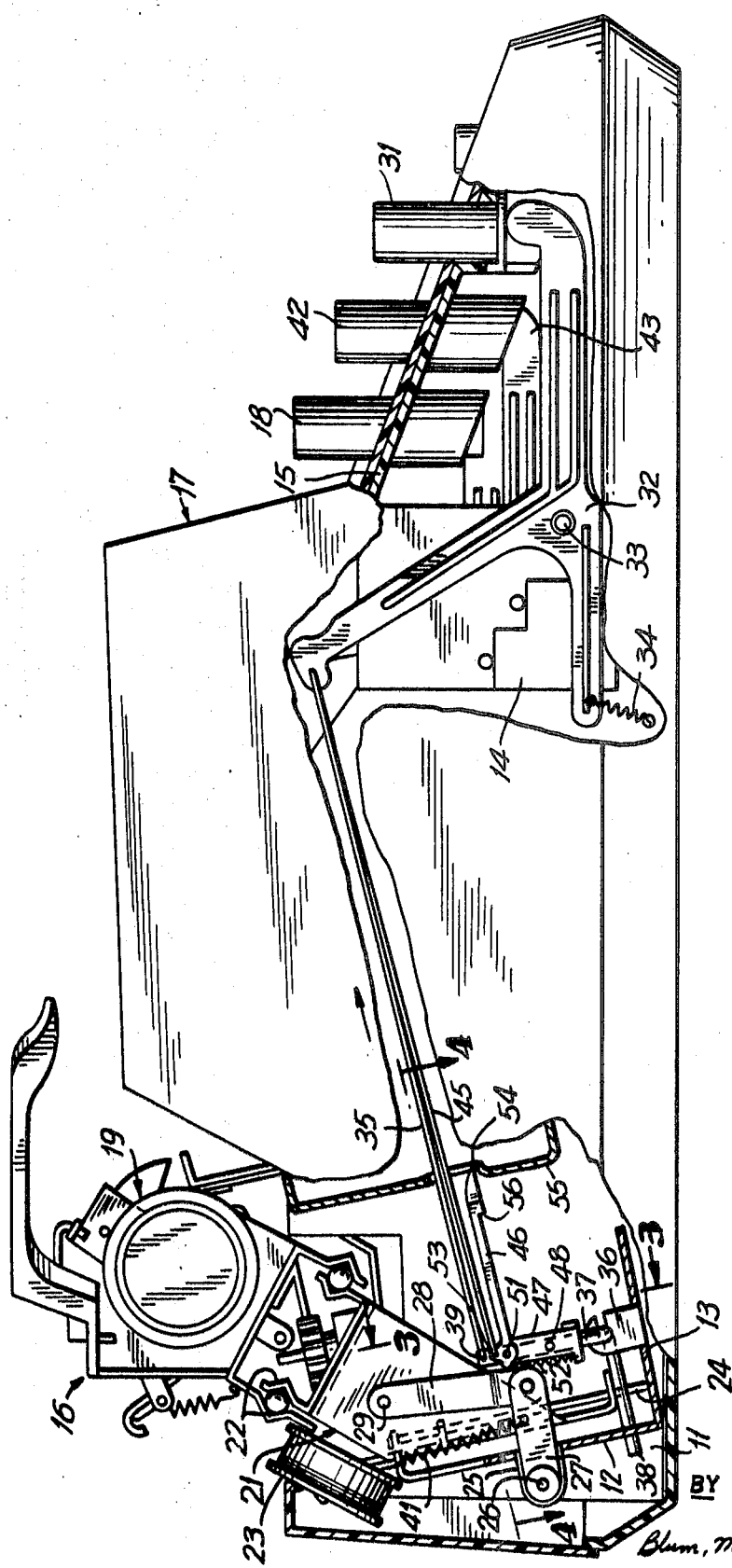
FIG. I
INVENTOR.
SHIGEAKI KURAMOCHI
BY
Blum, Moscovitz, Friedman + Kaplan
ATTORNEYS Patented March 30, 1971
3,572,488
2 Sheets-Sheet 2
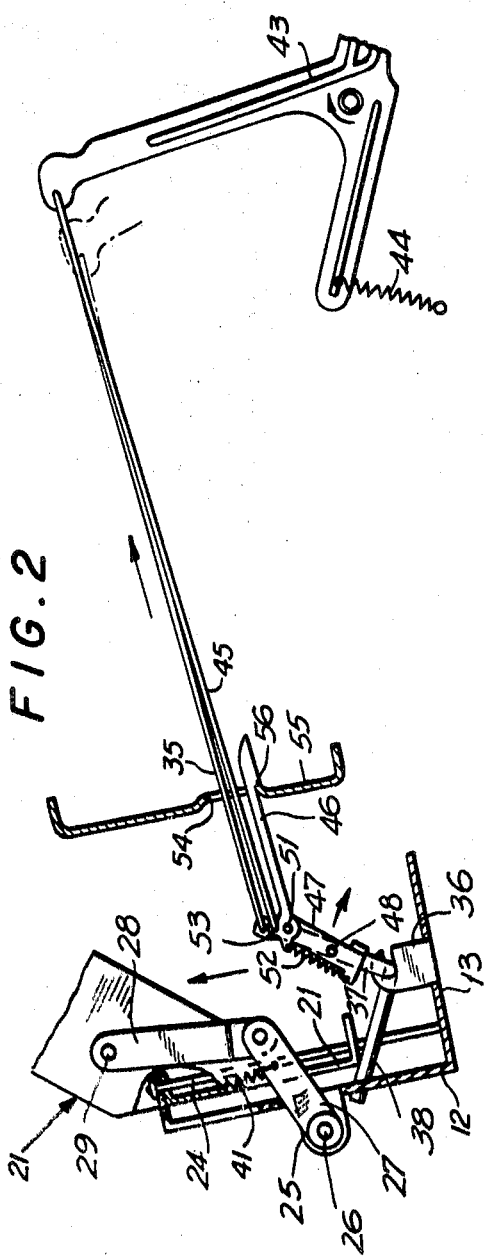
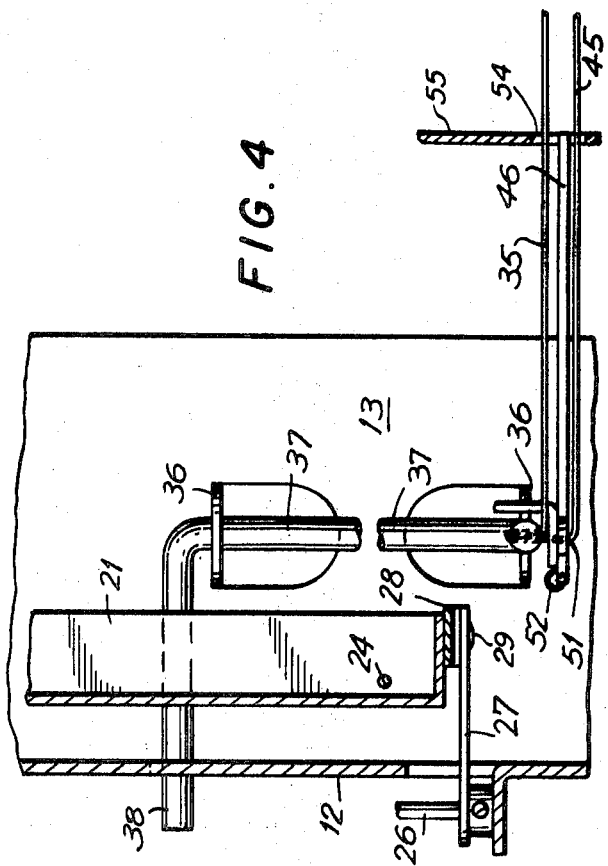
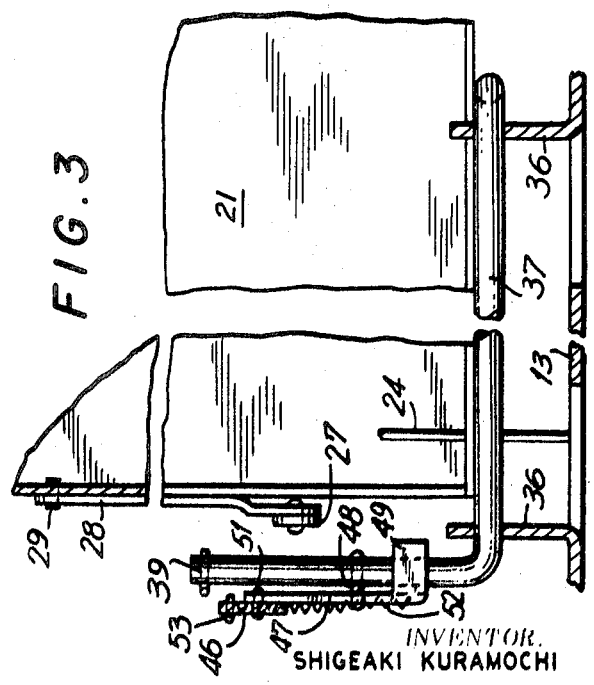
INVENTOR.
SHIGEAKI KURAMOCHI
BY
Blum, Moscovitz, Friedman & Kaplan
ATTORNEYS 3,572,488

SHIFT AND SHIFT LOCK MECHANISM FOR TYPEWRITER

BACKGROUND OF THE INVENTION

This invention relates generally to a shift mechanism for a typewriter and is more particularly directed to a shift lock mechanism cooperating with the carriage shifting mechanism for retaining the carriage in shifted position. While typewriter carriage shifts and shift locks are known in the art, the mechanism of the instant invention is of simplified and inexpensive construction to permit the incorporation of such mechanism in relatively inexpensive typewriters of the type that are sold for juvenile use. Due to the use of such typewriters, such typewriters must be inexpensively constructed but are preferably designed to simulate the operation of standard commercial typewriters so that the child will develop a familiarity with typewriters, will learn to type and will be able to make the transition to a standard typewriter as he becomes older.

SUMMARY OF THE INVENTION

Generally speaking, in accordance with the invention, a simplified shift and shift lock mechanism is provided which is especially suitable for incorporation in a juvenile typewriter of inexpensive construction. The shift and shift lock mechanism duplicates the operation of similar mechanisms on standard typewriters. To retain the carriage in a shifted position, a latching arm is provided which is normally biased to a nonlatching position and which is controlled by a shift lock key for advancement to a latching position. Bias of the latching arm to the nonlatching position is overcome by engagement of the arm with a portion of the typewriter frame with the latching arm being held in engagement as a result of the force applied thereto by the tendency of the carriage to move from the shifted position. When such force is overcome by operation of a shift key, the latching arm is permitted to move to the nonlatching position and the carriage can then return to the normal position when the shift key is released.

Accordingly, it is an object of this invention to provide a shift mechanism for a typewriter of improved and simplified construction.

Another object of the invention is to provide a shift lock mechanism for a typewriter which utilizes a latching arm which is normally biased to a nonlatching position and which is held in a latching position as a result of forces applied from the carriage when the carriage is in the shifted position.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which:

FIG. 1 is a partial sectional side elevational view of a typewriter incorporating a shift mechanism constructed in accordance with a preferred embodiment of the instant invention;

FIG. 2 is a partial elevational view of a preferred embodiment of the shift mechanism in shift lock position with elements being omitted for the sake of clarity;

FIG. 3 is a partial sectional view taken along line 3-3 of FIG. 1; and

FIG. 4 is a partial sectional view taken along line 4-4 of FIG. 1.

DESCRIPTION OF THE PREFERRED EMBODIMENT

While the shift mechanism of the instant invention is suitable for use in substantially any type of typewriter or other business machine requiring carriage shift, the mechanism disclosed herein is shown as incorporated in a typewriter of the type disclosed in U.S. Pat. No. 3,338,369 issued Aug. 29, 1967 in the name of Willis E. Rexford. A complete disclosure of such typewriter is found in the aforesaid Rexford patent and thus, for simplicity, the instant disclosure is generally limited to the elements required for disclosure of the preferred embodiment of the shift mechanism. A frame 11 includes, at the rear end, a rear wall 12 and a base wall 13. The frame 11 also includes, at the front end, comb elements 14 and a keyboard 15. A carriage assembly indicated generally at 16 is supported from rear wall 12 as will hereafter be described. A housing 17 envelops the frame 11 to impart an attractive and finished appearance to the typewriter.

A plurality of keys 18 are slidably received in keyboard 15 and project through the housing to define the keyboard of the typewriter.

Carriage assembly 16 includes a platen portion 19 which slides transversely with respect to a support section 21 via opposed, interengaging channels 22. A spring pulley 23 secured to support section 21 biases the platen portion 19 in a letter space direction under control of an escapement mechanism (not shown).

In order to shift the carriage assembly 16, the entire carriage assembly 16 must be raised and, for this purpose, posts 24 are secured to the frame 11 parallel to rear wall 12 and secured to base wall 13. Support section 21 is slidably mounted on posts 24 whereby the carriage assembly 16 is guided for movement between a lowered and a raised position.

At each side of the typewriter, a link mechanism is provided for further guidance of the carriage assembly 16. Lugs 25 projecting rearwardly of rear wall 12 pivotally receive a rod 26 extending along the rear of the rear wall 12. At each side of the typewriter, a first link 27 has one end secured to rod 26. The other end is pivoted to one end of a second link 28 whose opposite end is pivoted to support section 21 as at pivot 29. With the pivoted links 27 and 28 provided at each side of the typewriter and pivoted at one end to support section 21 and secured at the other end to rod 26, each end of the carriage assembly 16 is raised by an equal amount when the carriage assembly 16 is lifted from one end only.

As in standard typewriters, a shift key 31 is provided at each side of the keyboard and, since the shifting mechanism (not the shift lock mechanism) is the same at each side of the typewriter, one of the shifting mechanisms will now be described. A shift key 31 is slidably mounted through keyboard 15 and engages with one end of a key lever 32 for operating the key lever 32. Key lever 32 is pivoted at 33 to the comb elements 14 substantially at the intersection of the three arms of the key lever 32. A rearwardly extending arm of the key lever 32 is biased by a spring 34 connected to a portion of the frame 11 whereby the key lever 32 is biased to its normal position with shift key 31 in the raised position. The third arm of key lever 32 has one end of a wire link 35 pivoted at the end thereof. It can be seen from FIG. 1 that, when shift key 31 is depressed, the key lever 32 is rotated in a clockwise direction thereby moving wire link 35 in a forward direction as indicated by the arrow. Spring 34 biases the key lever 32 and wire link 35 in the reverse direction when shift key 31 is released.

As best seen in FIGS. 3 and 4, a pair of lugs 36 project upwardly from base wall 13. Pivotally mounted through lugs 36 is a shifting rod 37 having a rearwardly extending end 38 and an upwardly extending end 39. The rearwardly extending end 38 is positioned beneath and in contact with support section 21 and to the outer end of upwardly extending end 39 is pivoted the rear end of wire link 35. As shown in FIG. 1, when the shift key 31 is depressed and wire link 35 is moved in the direction of the arrow, shifting rod 37 is rotated in a clockwise direction, causing rearwardly extending end 38 to move upwardly in an arc to raise support section 21 and the carriage assembly 16 to a shifted position. The shift position will be retained so long as shift key 31 remains depressed and, under gravity, the carriage assembly 16 will return to the normal position when the shift key 31 is released. Note that a spring 41 secured between first link 27 and the upper end of rear wall 12 provides a counterbalance for the weight of the carriage assembly 16 in order to reduce the amount of force required to shift the carriage assembly 16 through shift key 31. As aforenoted, the shifting mechanism hereinabove described is duplicated on both sides of the typewriter so that the carriage assembly 16 may be shifted with either hand. The utilization of the first and second links 27 and 28 located at each side of the typewriter connected to a common rod 26 assures that both sides of the carriage assembly 16 will be shifted an equal amount regardless of which shift key 31 is depressed.

In order to lock the carriage assembly 16 in shifted position, it has become common practice to provide a shift lock operable from one side of the typewriter only, usually the left side of the keyboard 15 and, in order to more nearly simulate standard typewriters, the instant invention provides a single shift lock mechanism preferably located on the left side of the keyboard 15. To this end, a shift lock key 42 is slidably mounted in keyboard 15 in engagement with one end of a key lever 43 pivoted to comb elements 14 and substantially identical to key lever 32. The shift mechanism also includes a spring 44 (FIG. 2) for biasing the shift lock key lever 43 to the normal position.

To the upper end of one of the arms of key lever 43 is pivoted one end of a wire link 45, the other end of which is pivoted to the latching arm 46, as will now be described.

Latching arm 46 is shown in the normal nonoperating position in FIG. 1 and in the carriage shift locked position in FIG. 2. A plate 47 is pivoted intermediate its end as at 48 to upwardly extending end 39 of the shifting rod 37 intermediate the length of the upwardly extending end 39. At the lower end of plate 47 there is provided an inwardly extending arm 49 (FIG. 3) which overlies upwardly extending end 39 and limits relative rotation between plate 47 and the upwardly extending end 39 in the clockwise direction when viewed in FIG. 2. Intermediate the ends of latching arm 46 but proximate to the rear end thereof, a pivot 51 pivotally connects the latching arm 46 to the upper end of plate 47. Rearwardly of the pivot 51, a spring 52 acts between latching arm 46 and the lower end of plate 47 to bias the latching arm 46 in the counterclockwise direction as viewed in FIGS. 1 and 2.

The rear end of wire link 45 is pivotally connected to the latching arm 46 above pivot 51 as at 53.

The forward end of latching arm 46 extends through an aperture 54 in an intermediate wall 55 which forms part of frame 11. Note that wire links 35 and 45 also extend with clearance through aperture 54. Proximate to the outer end of latching arm 46 is a latch portion 56 adapted to engage with the lower edge of aperture 54 to act as a detent for retaining the carriage assembly 16 in shift lock position.

The operation of the shift mechanism may now be described. When it is desired to shift the carriage assembly 16 without locking same, shift key 31 is depressed thereby, through key lever 32 and wire link 35, rotating shifting rod 37 in the clockwise direction as viewed in FIG. 1 to raise the carriage assembly 16. Since the shift lock key 42 is not depressed, key lever 43 tends to remain stationary under the action of spring 44 whereby wire link 45 restrains latching arm 46 against forward movement. As upwardly extending end 39 moves toward intermediate wall 55 it carries with it pivot 48 to move forwardly the lower portion of plate 47. Plate 47 is permitted to move forwardly in an arc due to pivot 51 even though latching arm 46 remains substantially stationary and withdrawn from a latching position. Also, the bias on latching arm 46 by spring 52 holds the latching arm 46 in a raised, nonlatching position.

When it is desired to lock the shift or lock the carriage assembly 16 in the raised position, shift lock key 42 is depressed, effecting a rotation of key lever 43 and forward movement of the wire link 45. The forward movement of the wire link 45 first rotates latching arm 46 in the clockwise direction about pivot 51 and against the action of spring 52 to bring the lower forward end of the latching arm 46 into engagement with the lower edge of aperture 54 thereby arresting further clockwise rotation of the latching arm 46. Continued movement of wire link 45 causes plate 47 to be rotated in the clockwise direction until arm 49 abuts a portion of the upwardly extending end 39 of shifting rod 37 and thereafter continued forward movement of wire link 45 rotates the shifting rod 37 to raise the carriage assembly 16 to the shifted position. As the carriage assembly 16 approaches the fully raised position, latch portion 56 projects through aperture 54 and engages over intermediate wall 55. Engagement is assured as a result of the continued force applied to the latching arm 46 to rotate it in the clockwise direction through wire link 45. Shift lock key 42 may now be released and the weight of the carriage assembly 16 tends to cause reverse movement of the elements. However, with latch portion 56 engaged over the intermediate wall 55, the latching engagement maintains the latching connection and the carriage assembly 16 is thus held in the shifted position.

When it is desired to lower the carriage assembly 16 and release the shift lock, shift key 31 is depressed to slightly rotate shifting rod 37 in the clockwise direction. This effects a release of the holding forces applied to latching arm 46 and, since shift lock key 42 is not depressed, no forward movement is applied to the wire link 45 and thus no force is applied to bias latching arm 46 in the clockwise direction. With shift key 31 depressed, spring 52 immediately rotates latching arm 46 in the counterclockwise direction to raise it above the lower edge of aperture 54 whereby, upon release of shift key 31, the latching arm 46 may be withdrawn from its latching position through intermediate wall 55 and the carriage assembly 16 may be lowered to its normal position.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

I claim:

1. In a typewriter or like machine, in combination, a frame having front and rear ends, a carriage assembly, carriage assembly mounting means movably mounting said carriage assembly proximate the rear end of said frame, said carriage assembly being movable between a lowered normal position and a raised shifted position, shift means mounted to said frame and cooperating with said carriage assembly for raising said carriage assembly to said shifted position, said shift means including an operating element, a shift key at said front end of said frame, a first key lever pivoted to said frame and operatively associated with said shift key, first link means connected between said first key lever and said operating element for moving said carriage assembly to said shifted position an operation of said shift key, latching means pivoted to said operating element and including a forwardly projecting latch portion, means defining a latching surface on said frame, said latching means being movable between a latching position adapted for engagement with said latching surface and a nonlatching position, spring means biasing said latching means to said nonlatching position, a shift lock key at said front end of said frame, a second key lever pivoted to said frame and operatively associated with said shift lock key, and second link means connected between said second key lever and said latching means for moving said latching means to said latching position while concurrently moving said carriage assembly to said shifted position on operation of said shift lock key.

2. In a typewriter or like machine, the combination as claimed in claim 1 wherein said latching means includes a plate pivoted to said operating element and a latching arm pivoted to said plate, said forwardly projecting latching portion being provided on said latching arm.

3. In a typewriter or like machine, the combination as claimed in claim 2 wherein said spring means is connected between said latching arm and said plate whereby to bias said latching arm to said nonlatching position.

4. In a typewriter or like machine, the combination as claimed in claim 2 wherein said means defining a latching surface includes an intermediate wall on said frame and means defining an aperture therethrough, said latching arm projecting through said aperture.

5. In a typewriter or like machine, the combination as claimed in claim 2 wherein said operating element, said plate and said latching arm are movable in planes parallel to one another.

6. In a typewriter or like machine, the combination as claimed in claim 2 wherein said plate includes an abutment arm projecting in the path of movement of said operating element whereby to limit relative rotation in one direction of said plate with respect to said operating element about the pivot of said plate to said operating element.